(12) United States Patent
Schwenger et al.

(10) Patent No.: US 7,104,905 B2
(45) Date of Patent: Sep. 12, 2006

(54) BALL GAME RACKET

(75) Inventors: Ralf Schwenger, Straubing (DE); Udo Münster, Baar (CH)

(73) Assignee: Volkl Tennis GmbH, Baar (CH)

( * ) Notice: Subject to any disclaimer, the term of this patent is extended or adjusted under 35 U.S.C. 154(b) by 0 days.

(21) Appl. No.: 11/011,199

(22) Filed: Dec. 15, 2004

(65) Prior Publication Data
US 2005/0170919 A1  Aug. 4, 2005

(51) Int. Cl.
*A63B 49/00* (2006.01)

(52) U.S. Cl. .................................... 473/521
(58) Field of Classification Search ........... 473/539, 473/540, 534, 520–522
See application file for complete search history.

(56) References Cited

U.S. PATENT DOCUMENTS

| 360,468 A | 4/1887 | Phelps |
| 4,992,190 A | 2/1991 | Shtarkman |
| 5,314,180 A | 5/1994 | Yamagishi et al. |
| 5,368,297 A | 11/1994 | Liu |
| 5,458,331 A | 10/1995 | Bothwell |
| 5,615,905 A | 4/1997 | Stepanek et al. |
| 5,775,715 A | 7/1998 | Vandergrift |
| 5,775,716 A | 7/1998 | Harsanyi et al. |
| 5,857,694 A | 1/1999 | Lazarus et al. |
| 6,086,490 A | 7/2000 | Spangler et al. |
| 6,402,645 B1 | 6/2002 | Liao |
| 6,485,380 B1 | 11/2002 | Spangler et al. |
| 6,503,161 B1 | 1/2003 | Bothwell |
| 6,530,851 B1 | 3/2003 | Munster |
| 2002/0039937 A1 | 4/2002 | Bothwell |

*Primary Examiner*—Raleigh W. Chiu
(74) *Attorney, Agent, or Firm*—Hoffman, Wasson & Gitler, P.C.

(57) ABSTRACT

A ball game racket, especially a tennis racket, has a racket head formed by a tension frame with stringing, and a handle unit formed by a handle shaft or a racket neck joining the tension frame for example via a heart piece. Between a frame profile and the support profile a hose or cushion-type element is filled with an attenuating or damping liquid.

10 Claims, 3 Drawing Sheets

BALL GAME RACKET

BACKGROUND OF THE INVENTION

This invention refers to a ball game racket, especially a tennis racket, including a racket head formed by a tension frame with stringing and by a handle element connected to the tension frame, for example, by means of a core, and formed by a handle shaft, or a racket neck and a handle, as well attenuating means on at least one area of the racket frame.

Ball game rackets, especially designed as tennis rackets, are known in most different varieties.

Furthermore, hydraulic mediums, or liquids, are known to have a viscosity which can be altered by an electric, or electromagnetic field, in a controlled manner; the use of such liquids has been in connection with ski bindings (DE 195 17 417 A1).

It is one object of this invention to provide a ball game racket, the characteristics of which can be altered dynamically, for example, by using the racket dependent on forces exerted upon the racket.

SUMMARY OF THE INVENTION

The invention includes attenuating means with an attenuation fluid, the viscosity of which is controllable by an electric, and/or a magnetic field, and electric control means for altering the viscosity of the attenuation liquid.

BRIEF DESCRIPTION OF THE DRAWINGS

In the following, this invention is explained in connection with embodiments by referring to the drawings. The drawings show.

DETAILED DESCRIPTION OF THE INVENTION

Figure 1:
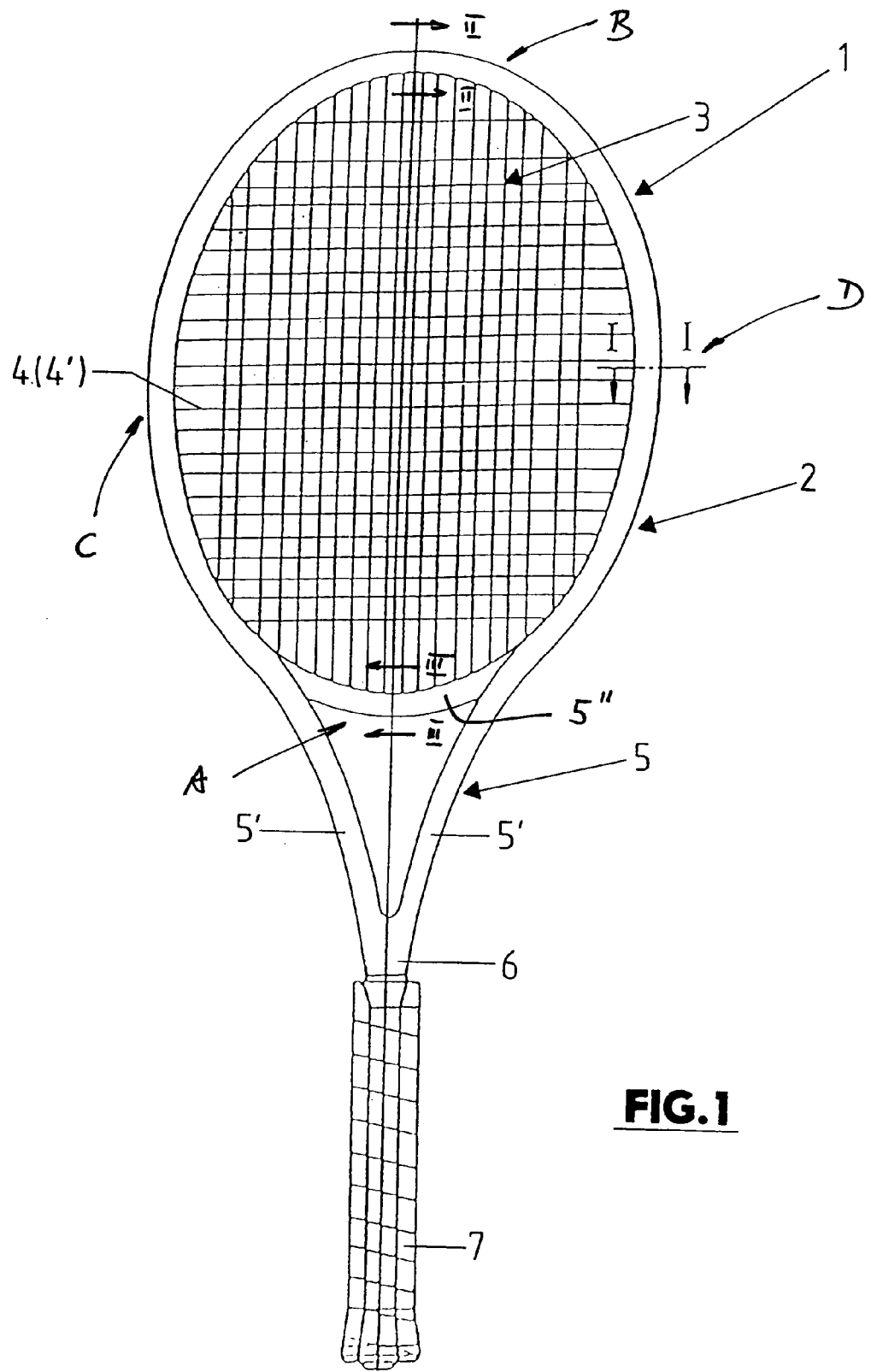
FIG. 1, in a simplified representation and in plan view, a ball game racket according to the invention designed as a tennis racket.

The tennis racket shown in the figures and generally marked by 1 includes a tension frame 2 forming the racket head, stringing 3 which has a plurality of crossing string lengths 4', or strings 4, and a racket neck, or racket handle shaft 6, joining the tension frame, or its profile 2' (FIG. 2), across a core 5; the racket handle 7 joins the racket neck.

The tension frame profile 2', the core 5 which is formed by two diverging webs, or arms 5', starting at the handle shaft 6, as well the handle shaft 6, form a one-piece racket frame, which according to the shown embodiment is designed as a hollow profile entirely closed from outside, or as a closed hollow frame made of suitable material, such as fiber reinforced plastic material forming a hollow profile which across its entire extension is closed outwardly.

Figure 2:
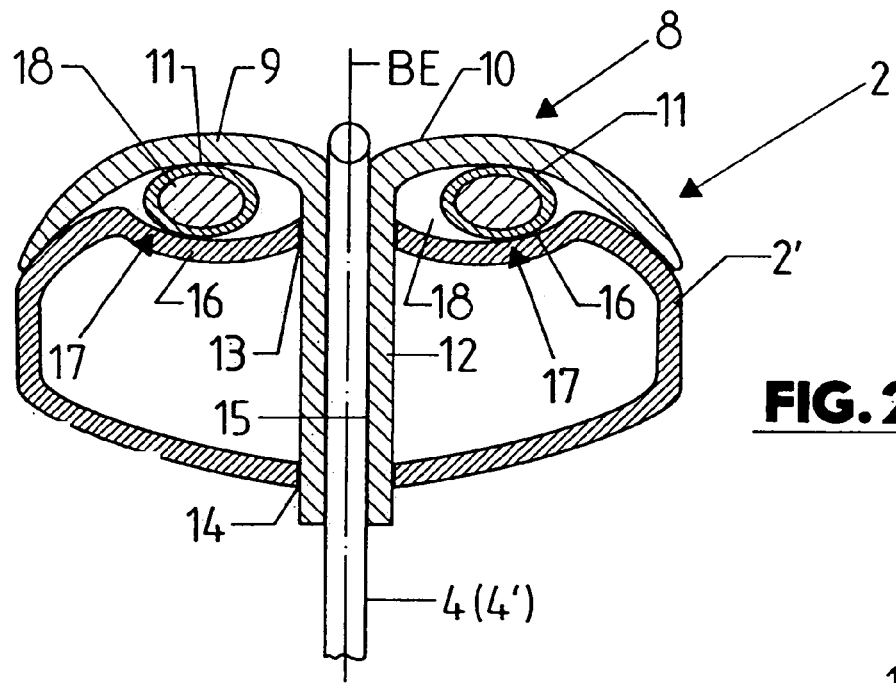
FIG. 2 is a cross-section along line I—I of FIG. 1 through the racket head or the tension frame.

As shown in FIG. 2, the tension frame 2, or the tension frame profile 2', in view of the stringing 3, is provided with an outer support profile 8 arranged outside thereof, which support profile, in the shown embodiment, embraces the tension frame profile 2' over its entire length between the arms 5' of the core 5. The support profile 8 is formed symmetrically in view of a center plane, which also is the stringing plane BE, and basically comprises a hood- or wing-type profile section 9, which is open towards the stringing 3; the profile section 9 with its both edges 9' rests sealingly upon the frame profile 2' formed by the closed hollow profile.

The wing-type curved profile section 9 within the area of the stringing plane BE is formed concavely on its outer surface opposite to the stringing 3, and forms a groove-type recess 10 embracing the racket head or tension frame 2 at the outside area. At both sides of said recess 10, the profile section 9 within the cross-section of FIG. 2 is curved in a substantially convex manner at its outer surface so that on both sides of the stringing plane BE, two sections are provided which in cross-section of FIG. 2 form a concave recess 11, at the inner side facing the stringing which recess also extends across the entire length of the supporting profile 8 parallel to recess 10. In addition, the supporting profile 9 has sleeves or eyelets formed thereon, which extend beyond that side of the profile section 9 facing the frame 2', and which are passed through bores 13 and 14 of the frame profile 2'. The eyelets 12 themselves have bores 15 through which the strings 3' are passed in a manner known in the field of stringing tennis rackets so that the corresponding string 4 extends outwardly in an assumed direction through the bore 15 of an eyelet 12, then extends within the recess 10 along the outer surface of the tension frame, and finally extends through a further eyelet 12, or its bore 15, back again to the interior, etc. With eyelets 12, the supporting profile 8 to a certain extent is movable in the direction of the axis of the eyelets 12 in view of the frame profile 2'. The supporting profile 8 is preferably made of fiber reinforced plastics material in such a manner that it, or alternatively the profile section 9 thereof, acts as a blade spring, and with a racket with stringing exerts the springy force onto the strings 4 required for the stringing.

With the shown embodiment, the frame profile 2', at the outer surface facing the profile section 9, is provided with a channel-type recess 16 at both sides of the stringing plane BE and distant thereof; one recess each is arranged opposite a recess 11. Within the spaces formed by said recesses 11 and 16, attenuating elements 17 are provided, which are in contact with the frame profile and the profile section 9. With the shown embodiment, said attenuating elements 17 are formed by elastic hoses closed at both ends and extending across the major length of the racket head between the webs 5', namely parallel to plane BE. The hoses 18 each are made of permanent elastic material, for example, of elastic plastics material, and are provided with a plurality of sections 18' which are reduced in cross-section and accordingly are operating as nozzles so that in longitudinal direction each attenuating element 17 is followed by a hose section 18" with a large inner cross-section and a hose section 18' with reduced cross-section in an alternating manner. The attenuating elements 17, or the hoses thereof, are filled with liquid attenuation means, with a hydraulic medium, or a liquid, the viscosity of which can be altered by an electric and/or a magnetic field.

Liquids or media (dispersions/suspensions), the viscosity of which can be altered by means of an electric or a magnetic field, and which can also be described as electro-rheological resp. magneto-rheological liquids, are known per se and for example are distributed by Fludicon GmbH, Landwehrstraße 50, 64293 Darmstadt, Germany. Furthermore, other suitable liquids or media are described among others within EP 0 845 790 A1 and U.S. Pat. No. 4,992,190, EP 0 406 692, JP 41 98 297 and U.S. Pat. No. 5,354,488.

The hose sections 18' are provided with electrodes 19, which when applying an electrical voltage generate an electrical field in the corresponding hose section 18'. The electrodes 19 at the hose sections 18' are connected with triggering electronic means 20 which are dependent on the signal of one or several sensors 21 and control the voltage applied between the electrodes 19, and thus the viscosity of the attenuating liquid flowing through the hose section 18', so that by means of the triggering electronic means 20, the throttle effect within sections 18' is controlled dependent on the signal of at least one sensor 21.

Figure 3:
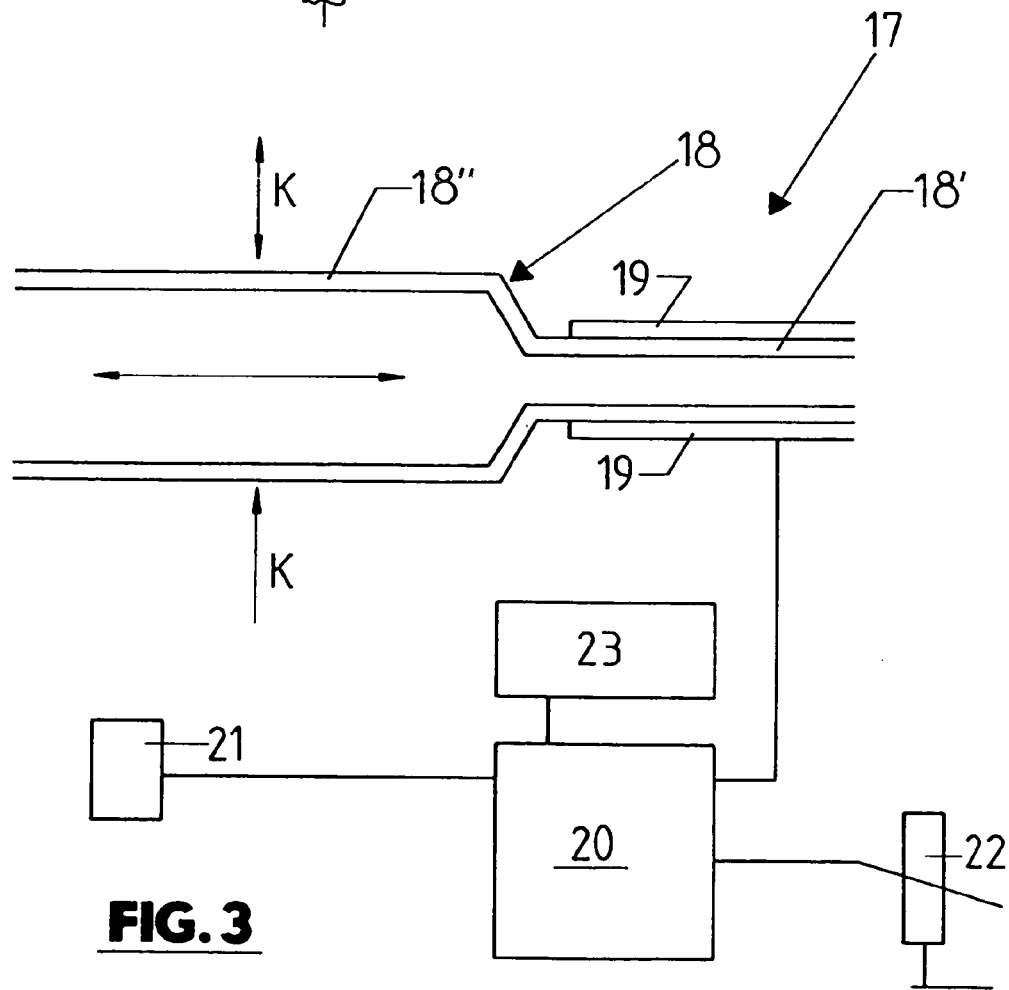
FIG. 3 is a basic representation of a circuit for adjusting the stiffness of the racket head tensioning.

In detail, the construction shown is designed so that when a ball hits an area of the racket surface and in view of the increased mechanical tension within the strings 4 at this location, the supporting profile 8 under elastic deformation of the profile section 9 is moved towards the frame profile 2' and in this way attenuating liquid is displaced from that part of the attenuating elements 17, as shown in FIG. 3 by arrows K. The displaced attenuating liquid then is distributed across the remaining length of the corresponding attenuating element by elastically deforming the corresponding hose 18, and flows through a hose section 18' acting as a throttle. Depending on the voltage applied to the electrodes 19 and the change effected thereby, the viscosity of the attenuating liquid acts upon the corresponding hose section 18' more or less as a throttle so that the characteristics of the tennis racket 1 can be dynamically controlled dependent on the signal of the at least one sensor 21.

Preferably, several sensors 21 are provided, for example, in such a way that when a ball hits an are of the racket surface in this area, or in other areas of the racket surface, the attenuation effect on the racket is increased by increasing the viscosity of the attentuating liquid, or vice versa the attenuation effect is reduced by reducing the viscosity of the attenuating liquid.

The sensor(s) 21 preferably are sensors operating according to the piezo effect, which are dependent on the deformation of the frame profile 2' or the support profile 8 produces an electric signal. Said sensors then are provided accordingly, at the frame profile 2', or at a support profile 8. Contrary thereto, the sensor(s) 21 can be designed so that the deformation of the support profile 8, relative to the tension frame profile 2', can be determined and a signal can be delivered, which is dependent therefrom. Other types of sensors 21 can be used, too.

The sensor(s) 21, moreover, can be arranged on the racket handle, or between the racket handle 7 and the racket head in such a manner that the signal generated by said sensors is dependent on the deformation or torsion of the racket frame or the racket core 5.

Basically, it is possible to trigger the pairs of electrodes 19 provided on the hose sections 18' individually or in groups by the control means 20, namely by signals of one or several sensors, for example by using available triggering patterns determined within the electronic means 20 or the memories thereof.

Furthermore, it is possible to provide adjustment means instead of the sensor 21 or in addition thereto, by means of which the attenuating action or stiffness of the damping elements 17 can be adjusted manually.

The electronic means 20, the required voltage supply, in the form of at least one battery, preferably a reloadable battery, and the adjustment means 22 and also the indication means 23, giving information concerning the condition of the system can be arranged, within the racket handle 7.

Above, there has been described that influencing the viscosity of the attenuating liquid is performed by means of an electric field. Basically, there is also the possibility to use a magnetic field instead of an electric field for acting upon the attenuating liquid. In this case, for example, at the hose sections 18' instead of electrodes 19 at least one magnetic coil each is used, which embraces the corresponding section 18' and which is triggered by the control means 20.

Above, there has also been described that the attenuating elements 17 are hoses. Generally, there is the possibility to provide individual, closed, for example cushion-type elements which are filled with an attenuating liquid the viscosity of which is controlled by means of an electric or a magnetic field.

Contrary to the described structure, there is also the possibility to provide chambers or closed spaces for receiving the liquid altering the viscosity within the racket or racket head frame in such a manner that any deformation of the racket frame or racket head frame results in a flow of said liquid. By altering the viscosity of the liquid the flow thereof can be promoted in a controlled manner or can be reduced so that then the deformability of the racket head frame or the racket frame altogether can be controlled.

FIG. 4 shows again the tension frame profile 2' and one of the strings 4, which reaches through the tension frame profile and abuts against a string supporting element 24 (Osenband) at the periphery of the tension frame 2. A two-piece sensor 21 is arranged inbetween the string supporting elemetns 24 and the tension frame 2. This string 4 runs in between a tension frame area A neighbored the core 5 or core element 5" and a tension frame area B which is opposite the tension frame area A in the driection of the longitidunal axis of the handle element 7.

Figure 4:
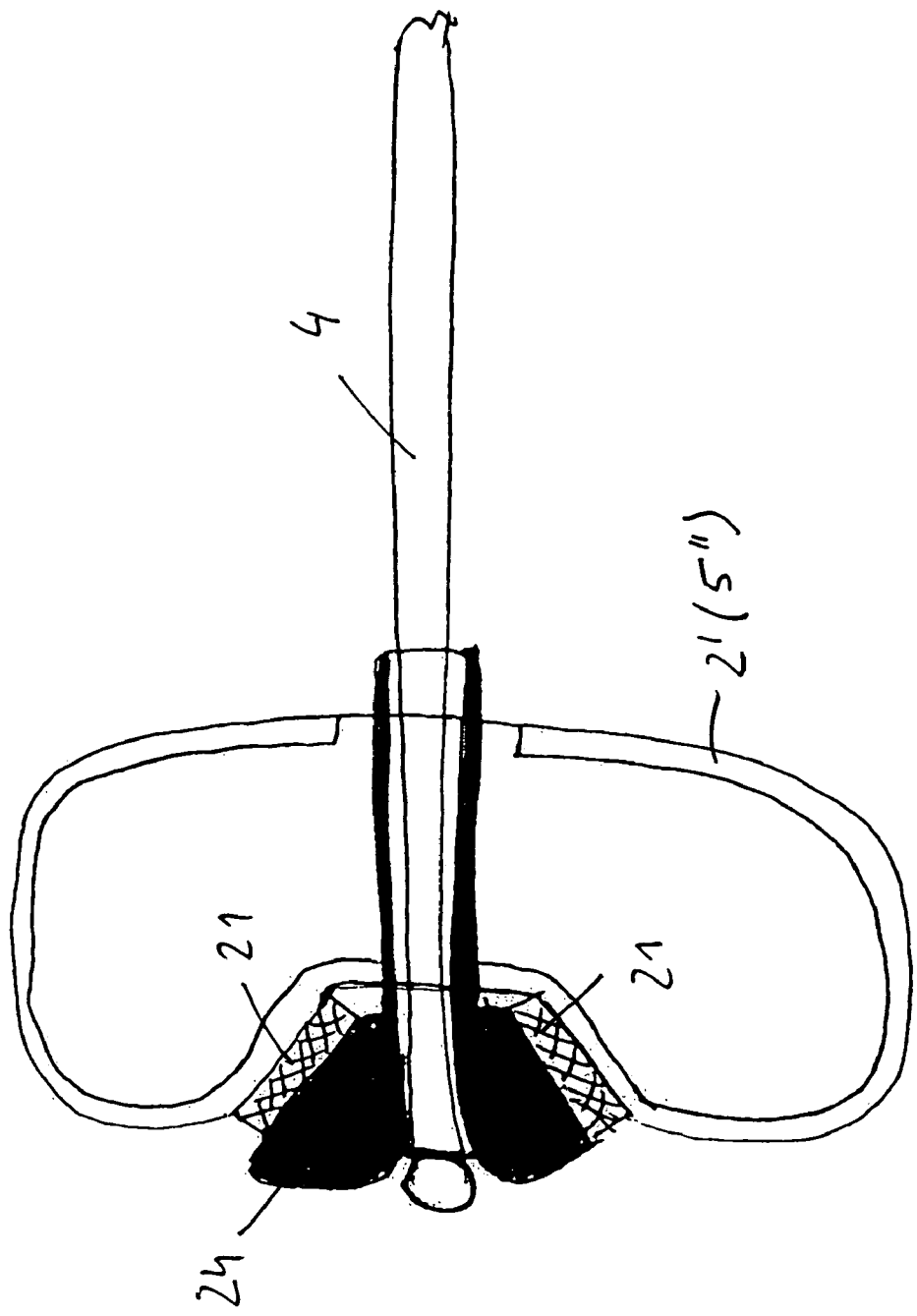
FIG. 4 is a cross-sectional view along lines 2—2 or 3—3 of FIG. 1.

A sensor 21 is provided at each of these areas A, as is shown in FIG. 4. The attenuating elements are each formed by a hose-type or cushion-type element with a closed interior for the attenuating liquid provided on the side areas of the tension frame in between the areas A and B, meaning on the tension frame areas C and D between the frame profile 2' and the support profile B, as shown in FIG. 2.

The invention has been described in connection with various embodiments. The expert realizes that numerous further alterations and revisions will be possible without leaving the scope of invention.

LIST OF REFERENCE NUMERALS 1 tennis racket
2 tension frame
2' tension frame profile
3 stringing
4 string
4' string length
5 core
5' arm
6 handle shaft
7 racket handle
8 support profile
9 profile section
10, 11 recess
12 eyelet
13, 14 bore
15 bore
16 recess
17 attenuating element
18 hose
18', 18" hose section 19 electrode
20 control electronic means
21 pressure sensor
22 adjustment device
23 indication

What is claimed is:

1. A game ball racket comprising:
a racket head formed by a tension frame with stringing and by a handle element joining the tension frame, for example by means of a core, and formed by a handle shaft or a racket neck and a handle,
the tension frame comprising a frame profile and a support profile used for fastening the stringing,
damping or attenuating means which are provided between a frame profile and the support profile and which include a hose or cushion-type element which is filled with an attenuating or damping liquid,
electric control means on the attenuation means for altering the viscosity of the attenuation liquid and at least one sensor on the tension frame generating a sensor signal for the control means which sensor signal is responsive to the deformation of the tension frame.

2. The ball game racket according to claim 1, wherein the at least one sensor is a sensor operating according to the piezo-effect.

3. The ball game racket according to claim 1, wherein said attenuating means form at least two chambers for receiving the attenuation fluid, which chambers are connected with each other at least by a connector section operating as a throttle, and said connector section is provided with at least one electrode triggered by said control means and/or is provided by a magnetic coil triggered by said control means.

4. A ball game racket comprising:
a racket head formed by a tension frame with stringing and by a handle element joining the tension frame, for example by means of a core and formed by a handle shaft or a racket neck and a handle,
the tension frame comprising a frame profile and a support profile used for fastening the stringing,
damping or attenuating means which are provided between a frame profile and the support profile and which include a hose or cushion-type element which is filled with an attenuating or damping liquid,
electric control means on the attenuating means for altering the viscosity of the attenuation liquid, and
at least one sensor signal is responsive to the stresses caused in the stringing by a ball impact.

5. The ball game racket according to claim 4, wherein the at least one sensor is a sensor operating according to the piezo-effect.

6. The ball game racket according to claim 4, wherein said attenuating means form at least two chambers for receiving the attenuation fluid, which chambers are connected with each other at least by a connector section operating as a throttle, and said connector section is provided with at least one electrode triggered by said control means and/or is provided by a magnetic coil triggered by said control means.

7. A ball game racket comprising:
a racket head formed by a tension frame with stringing and by a handle element joining the tension frame, for example by means of a core, and formed by a handle shaft or a racket neck and a handle,
the tension frame forming a first tension frame area where the handle element or the core join the tension frame and a second tension frame area opposite to the first frame area in a direction of a handle axis,
the tension frame comprising a frame profile and a support profile used for fastening the stringing,
damping or attenuating means which are provided between the frame profile and the support profile on side areas of the tension frame inbetween the first and second tension frame areas and which are closed hose or cushion-type elements including a damping or attenuation fluid the viscosity of which is controllable by an electric or magnetic field,
electrical control means for altering the viscosity of the attenuation liquid in response to a sensor signal,
at least one sensor on at least one of the first and second tension frame areas and sensor generating the sensor signal as a response to the stresses used in the stringing by a ball impact.

8. The ball game racket according to claim 7, wherein the at least one sensor is a sensor operating according to the piezo-effect.

9. The ball game racket according to claim 7, wherein the at least one sensor is arranged inbetween the frame profile and the support profile.

10. The ball game racket according to claim 7, wherein the at least one sensor is arranged inbetween the frame profile and the stringing.

* * * * *